United States Patent Office 3,579,587
Patented May 18, 1971

3,579,587
PROCESS FOR THE PREPARATION OF THE DEXTROROTATORY 2,2' - (ETHYLENE-DI-IMINO)-DI-1-BUTANOL
Giorgio Zoja, Milan, Italy, assignor to Laboratorio Chimico Farmaceutico Giorgio Zoja S.p.A., Milan, Italy
No Drawing. Filed Nov. 13, 1968, Ser. No. 775,536
Claims priority, application Great Britain, Apr. 18, 1968, 18,491/68
Int. Cl. C07c 89/00
U.S. Cl. 260—584    8 Claims

ABSTRACT OF THE DISCLOSURE

A process for the production of pure (+)2,2'-(ethylenediimino)-di-1-butanol dihydrochloride formed by reacting a solution of (+)2-amino-1-butanol and (−)2-amino-1-butanol with (+)tartaric acid, separating the diastereoisomers by fractional crystallization using boiling methyl alcohol and reacting the highly pure (+)2-amino-1-butanol (+)hydrogen tartarate with ethylene dichloride in the presence of an inert organic solvent and a calcium compound, concentrating the reaction solution, removing insoluble calcium salts and saturating with gaseous HCl to precipitate (+)2,2'-(ethylenediimino)-di-1-butanol dihydrochloride.

---

The present invention refers to an industrial process for the preparation of highly pure, pharmaceutically suitable dextrorotatory 2,2'-(ethylenediimino)-di-1-butanol dihydrochlorite with high yields.

The compound 2,2'-(ethylenediimino)-di-1-butanol dihydrochloride of formula:

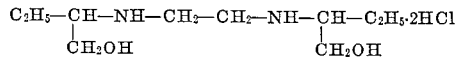

is known. This compound may exist in two optical antipodes, the levorotatory and the dextrorotatory form and also as meso-form and racemic mixture. It is also known that of the stereoisomers the dextro-form is endowed with antitubercular activity higher than that of the meso and levo-form, this latter being inactive at the maximum tolerated dose. Moreover the dextro-form is quite devoid of unpleasant side effects.

At this time there exists a lot of pharmacological and clinical tests demonstrating the great activity against tubercular affections of dextrorotatory 2,2'-(ethylenediimino)-di-1-butanol, as well as the fact that this dextroform must be quite pure, and in particular free of levoform, to avoid obnoxious side-effects due to the levorotatory product.

All this premised, it is evident how desirable it was to find a method suitable to produce with industrial yields the highly pure dextrorotatory 2,2'-(ethylenediimino)-di-1-butanol di-hydrochloride.

However, up to today no such method had been found, but only methods were known through which the racemic mixture of said compounds was prepared, from which it was impossible to separate the dextro-form, and therefore of no utility in the pharmaceutical field. Highly pure dextro-form could be obtained only starting from highly pure (+)2-amino-1-butanol, through a resolution process, giving so low yields to be considered as laboratorium process, rather than an industrial one.

For the sake of simplicity, we will indicate in what follows with (+) the dextrorotatory forms, with (−) the levorotatory forms and with (±) the racemic mixtures.

More precisely, it was known from J.A.C.S., 83; 2212 (1961) that (+)2,2'-(ethylenediimino)-di-1-butanol was prepared by reaction of the (+)2-amino-1-butanol with dichloro ethane; the (+)2-amino-1-butanol being obtained from (±)2-amino-butanol by the tartrate resolution procedure of Radke, J.A.C.S., 76, 2801, 1954.

However, the (+)2,2'-(ethylenediimino)-di-1-butanol so prepared (owing to the fact that Radke only obtains the pure (−)2-amino-1-butanol), occurs with such low yields as to render impossible to industrially use this method while, the more, the product so obtained is quite impure by the meso 2,2'-(ethyelenediimino)-di-1-butanol and by the (±)2,2'-(ethylenediimino)-di-butanol.

As a consequence, neither the difficulties in the preparation process, nor the impurity of the final pharmaceutical product, with respect to the processes starting from the racemic 2-amino-1-butanol, are avoided.

We have now found a new process, which leads to the (+)2,2'-(ethylenediimino)-di-1-butanol dihydrochloride through a few, simple steps, easily performed on industrial scale with high yields; the more, it leads to a highly pure product, which may be immediately utilized for pharmaceutical purposes, being in particular quite free from meso-form and levo-form.

The new process is essentially based on two surprising facts found by the applicant. Firstly, the applicant has found that inexplicably, while the (−)2-amino-1-butanol (+)hydrogen tartrate and the (+)2-amino-1-butanol (+)hydrogen tartrate are nearly equally soluble in absolute ethyl alcohol, and while the (+)2-amino-1-butanol (+)hydrogen tartrate is more soluble than the (−)2-amino-1-butanol (+)hydrogen tartrate in an ethanol-water mixture containing 95% ethanol, if methyl alcohol at its boiling point is used, the (−)2-amino-1-butanol (+)hydrogen tartrate is completely dissolved while the (+)2-amino-1-butanol (+)hydrogen tartrate is only slightly solubilized.

When account is taken of the closeness in the behaviour of ethyl alcohol and methyl alcohol, in particular with respect to the solvent power, it is immediately evident how unexpected is what is found by the applicant.

Particularly surprising is the fact that, while the solubility of (+)2-amino-1-butanol (+)hydrogen tartrate in methyl alcohol varies only so slightly from room temperature to the boiling temperature of the solvent that this compound is considered in any case very sparingly soluble, the solubility of the (−)2-amino-1-butanol (+)hydrogen tartrate which is moderate at room temperature, increases so markedly at the solvent boiling temperature that the product and the solvent become practically miscible in every ratio, thus allowing an easy, perfect separation, impossible under any other condition known up to today.

The second surprising fact found by the applicant is that the (+)2-amino-1-butanol (+)hydrogen tartrate is able to react directly with the ethylene dichloride, under suitable, critical conditions and the desired product can be easily separated from the reaction mixture.

This never suspected possibility has allowed the suppression of all the steps performed up to today to recover and purify the (+)2-amino-1-butanol from its tartrate.

Essentially, the new process, object of the present invention, comprises the following steps:

(a) Equimolecular amounts of racemic 2-amino-1-butanol and (+)tartaric acid are made to react in aqueous solution, the amount of water being in the ratio of 0.8–1.2:1 with respect to the total weight of the reactants present. Thus the solution is cooled at 0–10° C. under vigorous stirring. A substantial amount of the (—)2-amino-1-butanol (+)hydrogen tartrate precipitates and is removed by filtration or by centrifugation.

(b) The aqueous solution is concentrated by heating under vacuum, in one or more steps, until its volume is reduced to 3.4 times the volume of the initially used aminobutanol; one or more fractions, prevailingly consisting of (+)2-amino-1-butanol (+)hydrogen tartrate, precipitate by cooling to 0°–10° C. under vigorous stirring. These fractions, after drying, are treated with boiling, anhydrous methyl alcohol in the ratio of 0.5–0.8 in volume by weight of treated product. The boiling solution is discarded and the residue is treated again with boiling methyl alcohol in the ratio V:W of 0.1–0.3. The insoluble product is recovered from the boiling solution and washed with methanol. A highly pure (+)2-amino-1-butanol (+)hydrogen tartrate is obtained with yields ranging from 60 to 70%.

(c) The (+)2-amino-1-butanol (+)hydrogen tartrate is dissolved in at least 2 parts of an organic solvent boiling between 100° and 130° C. containing dichloro ethans, preferably in excess on the stoichiometric ratio. The whole is kept under reflux and stirring, while adding 1.5 moles of powered CaO or of $Ca(OH)_2$ for each mole of used tartrate. The reaction is continued for 2 further hours.

After this time, a portion of the solvent is distilled off and the insoluble calcium salts are removed by filtration from the still hot solution.

Upon saturation of the solution with gaseous hydrogen chloride and cooling, the (+)2,2'-(ethylenediimino)-di-1-butanol dihydrochloride precipitates, which is thereafter recrystallized from ethanol.

(d) From the mother liquors, the unreacted (+)2-amino-1-butanol (+)hydrogen tartrate is recovered by first introducing an air stream to eliminate the most of the dissolved HCl and then adding, under stirring, NaOH. The precipitated NaCl is filtered and the hot solution is added with the stoichiometric amount of (+)tartaric acid. By cooling, the (+)2-amino-1-butanol (+)hydrogen tartrate precipitates, which is recycled. The yields of (+)2,2'-(ethylenediimino)-di-1-butanol dihydrochloride with respect to the effectively consumed (+)2-amino-1-butanol (+)hydrogen tartrate range from 50 to 60%.

The following example is reported in order to more clearly illustrate the invention object of the present application, without however constituting a limitation of the same.

EXAMPLE

To a solution of 98 kg. of (+)tartaric acid in 130 litres of water, 58 kg. or racemic 2-amino-1-butanol are added.

After cooling up to 3° C., under vigorous stirring, 49 kg. of (—)2-amino-1-butanol (+)hydrogen tartrate precipitate, which are removed by centrifugation. The volume of the aqueous solution is reduced to 10/17 of its value by concentration under reduced pressure. The solution is then cooled to 3° C. under vigorous stirring; a crystalline fraction prevailing constituted of (+)2-amino-1-butanol (+)hydrogen tartrate precipitates and is collected by centrifugation.

The aqueous solution is again concentrated under reduced pressure to 10/17 of its volume, cooled to 3° C. under vigorous stirring and a second crop prevailing consisting of (+)2-amino-1-butanol (+)hydrogen tartrate is collected by centrifugation.

The two fractions collected are dried and intimately admixed with 100 l. of anhydrous boiling methanol.

The boiling methanolic solution is removed and substituted with further 30 litres of anhydrous, boiling methanol. After admixing and separation of the boiling solution, 15 litres of fresh, anhydrous, boiling methanol are added. After intimately admixing, the mixture is cooled and filtered at room temperature.

49 kg. of (+)2-amino-1-butanol (+)hydrogen tartrate are so obtained, with a M.P. of 140–141° C. and $[\alpha]_D^{22} = 23.5$ (c. 12, $H_2O$).

100 kg. of the highly pure (+)2-amino-1-butanol (+)hydrogen tartrate so obtained are dissolved in a boiling mixture consisting of 250 l. butanol and 35 l. ethylene dichloride. While keeping at the boiling temperature and under vigorous stirring, 38 kg. of powered CaO are gradually added; the solution is then refluxed for further 2 hours.

After this time 170 litres of solvent are distilled off, the precipitated calcium salts are removed from the hot solution and the same is saturated with gaseous hydrogen chloride. After cooling, a crop of crystals is separated, washed with butanol and crystallized from ethyl alcohol.

22 kg. of (+)2,2'-(ethylenediimino)-di-1-butanol dihydrochloride are thus obtained, having a M.P. of 202° C. and $[\alpha]_D^{28} = +7.4°$ (c. 277, $H_2O$).

In order to recover the unreacted (+)2-amino-1-butanol (+)hydrogen tartrate; the butanolic mother liquors are freed from the most of the dissolved HCl, by means of an air stream and are added with 20 kg. of NaOH, under stirring. The formed NaCl is removed and the stoichiometric amount of tartaric acid is added to the boiling solution.

By cooling, 50 kg. of (+)2-amino-1-butanol (+)hydrogen tartrate precipitate, which are separated by filtration or centrifugation and recycled.

What is claimed is:

1. A process for the preparation of (+)2,2'-(ethylenediimino)-di-1-butanol dihydrochloride, particularly free of the levo-isomer, characterized in that an aqueous solution of a mixture of (+)2-amino-1-butanol and (—)2-amino-1-butanol is reacted with about an equal molecular amount of (+)tartaric acid, separating the two hydrogen tartrate diastereoisomers by fractional crystallization involving the purification of the fractions rich in (+)2-amino-1-butanol (+)hydrogen tartrate with boiling methyl alcohol; reacting the highly pure (+)2-amino-1-butanol (+)hydrogen tartrate with ethylene dichloride in the presence of an inert organic solvent and a calcium compound selected from the group consisting of CaO and $Ca(OH)_2$ under reflux with stirring; concentrating the reaction solution, removing the insoluble calcium salts, and saturating with gaseous HCl to precipitate said (+)2,2'-(ethylenediimino) di-1-butanol dihydrochloride.

2. The process according to claim 1, wherein the weight of water contained in said aqueous solution of (+)tartaric acid and the weight of the tartaric acid and 2-amino-1-butanol isomers is a ratio between 0.8 and 1.2.

3. The process according to claim 1, wherein a substantial portion of (—)2-amino-1-butanol (+)hydrogen tartrate is crystallized out by cooling said aqueous solution by vigorous stirring at a temperature between 0 and 10° C.

4. The process according to claim 3, wherein said fraction rich in (+)2-amino-1-butanol (+)hydrogen tartrate is obtained by concentrating the mother liquors in one or more steps, under reduced pressure, up to about 3.4 times the initial volume of (2)amino-1-butanol, and cooling, with vigorous stirring at a temperature between 1 and 10° C.

5. The process according to claim 4, wherein the fraction rich in (+)2-amino-1-butanol (+)hydrogen tartrate is purified by intimate mixing with boiling methyl alcohol in two successive steps and further characterized wherein the ratios of alcohol volume with respect to the weight of the mass of treated crystals is between 0.5 and 0.8 and 0.1 and 0.3, respectively.

6. The process according to claim 5, wherein said (+)2-amino-1-butanol (+)hydrogen tartrate, said ethylene dichloride and said calcium compound are reacted in the presence of a solvent boiling between 100° and 130° C., for a period of from two to three hours.

7. The process according to claim 6, wherein said solvent is butanol.

8. The process according to claim 1, wherein the unreacted (+)2-amino-1-butanol (+)hydrogen tartrate is recovered from the final mother liquor by removing most of the dissolved HCl with an air stream and the residual portion by precipitation with NaOH, further collecting the stoichiometric amount of (+)tartaric acid and collecting said precipitated (+)2-amino-1-butanol (+)hydrogen tartrate.

References Cited
UNITED STATES PATENTS 3,116,332  12/1963  Sullivan _____ 260—584
3,401,194  9/1968  Zoja _____ 260—584X CHARLES B. PARKER, Primary Examiner R. L. RAYMOND, Assistant Examiner U.S. Cl. X.R.

260—501.17